(12) United States Patent
Stoughton (10) Patent No.: US 6,775,373 B2
(45) Date of Patent: Aug. 10, 2004

(54) SYSTEM FOR AND METHOD OF CHANNEL ASSOCIATED SIGNALING BACKHAUL IN A ROUTING SYSTEM

(75) Inventor: Ronald Milton Stoughton, Columbia, MD (US)

(73) Assignee: Ericsson Inc., Plano, TX (US)

( * ) Notice: Subject to any disclaimer, the term of this patent is extended or adjusted under 35 U.S.C. 154(b) by 531 days.

(21) Appl. No.: 09/882,589

(22) Filed: Jun. 14, 2001

(65) Prior Publication Data

US 2002/0191768 A1 Dec. 19, 2002

(51) Int. Cl.[7] .......................... H04M 7/00; H04L 12/28; H04J 3/16
(52) U.S. Cl. ...................... 379/219; 370/467; 370/469; 370/401
(58) Field of Search ............................ 379/219, 220.01, 379/221.01, 229, 230; 370/352, 401, 431, 464, 466, 467, 469

(56) References Cited

U.S. PATENT DOCUMENTS 5,712,906 A   1/1998   Grady et al. ............. 379/93.17
6,680,952 B1 * 1/2004   Berg et al. ................. 370/467

FOREIGN PATENT DOCUMENTS

| EP | 0 822 731 A | 2/1998 |
| WO | WO 01 37606 A | 5/2001 |

* cited by examiner

Primary Examiner—Benny Tieu (57) ABSTRACT

An open network gateway system for use with networks that do not have dedicated Signaling System No. 7 signaling is provided by associating channel-associated signaling received over a first communication line with individual media channels on a second communication line and embedding channel-associated signaling in a media stream in the form of line supervision signaling and register signaling and using a public switched telephone network line supervision driver to monitor and manipulate line supervision signals and interface to the public switched telephone network dial manager. The associated signaling is then backhauled into a media gateway controller for processing and manipulating the data connection.

22 Claims, 10 Drawing Sheets

FIG. 10 though demand placed on an individual network grows, additional capacity must be added. For example, as our economy and society become more connected, network

SYSTEM FOR AND METHOD OF CHANNEL ASSOCIATED SIGNALING BACKHAUL IN A ROUTING SYSTEM

1. FIELD OF THE INVENTION

The invention provides a system and method for performing channel-associated signaling backhaul of non-ISDN formatted signals in an open network gateway routing system.

2. BACKGROUND OF THE INVENTION

Due to the convergence of data and voice networks in today's advanced telecommunications industry, open network gateway (ONG) routing systems must provide processing (also known as "switching") of a variety of call signals. However, the desire to increase routing system throughput while reducing complexity continues to drive companies toward efficiency and scalability.

In the past, telephony switches and routing systems were designed as monolithic systems that became very expensive as they were scaled to handle large numbers of connections. However, as the evolution of network technology increases in pace, the cost of such systems can no longer be amortized over long periods of time, and rapid upgrades in performance and functionality are required for operators to remain competitive. In addition, operators are now more reluctant to tie their fortunes to a single vendor and prefer system architectures that are modular and based on open protocols and standards.

Organizations such as the Internet Engineering Task Force (IETF), the International Telecommunications Union (ITU), Multiservice Switching Forum (MSF), and the International Softswitch Consortium (ISC) have begun to develop architectures and protocols that address these needs. These developments come at a time of converging voice and data networks and growing demand for larger and more sophisticated routing systems, such as open network gateways that can adapt various forms of media for transport over IP networks.

Signaling System No. 7 (SS7) is the preferred signaling protocol for call management in large, digital networks because of its efficiency, scalability, and supported features. SS7 provides an architecture for performing out-of-band signaling in support of the call-establishment, billing, routing, and information-exchange functions of the public switched telephone network (PSTN). In service areas where SS7 signaling is not available, most ONG routing systems are capable of processing Integrated Services Digital Network (ISDN) signals with little difficulty, due to the compatibility of signal software protocols associated with the ONG system. However, in less-developed areas of the world that continue to employ analog technology, ISDN signaling may also be unavailable. Instead, these public switched telephone networks use channel-associated signaling (CAS), which is not easily integrated with ONG software protocols.

Currently, routing systems, such as network access systems (NAS), are being used in networks that employ a variety of call management signaling. Such systems typically include embedded hardware and software modules that implement complex algorithms used to identify, route, and process call signals. These routing systems must support the totality of signaling protocols used throughout the market area or must be manufactured and/or configured to support the unique requirements of particular submarkets. In addition, the processing of complex call signals often consumes valuable resources that degrade the overall performance of the routing system. The complexity of network access systems and similar devices greatly increases the associated development, manufacturing, and maintenance costs. What is needed is a way to reduce the complexity of a routing system.

As the demand placed on an individual network grows, additional capacity must be added. For example, as our economy and society become more connected, network access nodes must be added to accommodate the increase in traffic, as well as an expanding customer base. However, monolithic routing systems do not scale well because each additional access node replicates the complex call signaling subsystems embedded within them. Although traffic handling may be enhanced via distribution across multiple systems, call management is often adversely affected due to its centralized nature and need to access common databases. There is a need in the art for a way to easily scale the configuration of routing systems.

Many different types of call signaling protocols are used throughout the world. Even when a common protocol is used throughout a wide geographical area, different countries and regions often use national variations that must be certified by accredited organizations. SS7 signaling is used in most developed nations and is the preferred protocol implemented by open network gateway (ONG) systems. Such systems are typically optimized to use SS7 signaling. Where SS7 is not used, increased overhead results in slower processing, thus degrading ONG system throughput. There is a need in the art for a way to provide an ONG system to networks that do not have dedicated SS7 signaling.

3. SUMMARY OF THE INVENTION

The invention relates to a method of channel-associated signaling backhaul. The method generally includes the step of receiving communication data over a first communication link. The method further includes the step of determining whether the received communication data supports SS7 signaling. The step of determining whether the received communication data supports SS7 signaling further includes identifying the presence of CAS signaling protocol identifiers in a media channel or associated subchannel. Where received communication data does not support SS7 signaling, the method further includes accomplishing a set of steps of transmitting a setup message to a DMS1 service interface and converting DMS1 signals to Q.931 messages and backhauling such messages to a signaling station. In one embodiment the Q.931 messages are compatible with an ISDN Q.921 user adaptation layer.

The step of receiving communication data over a first communication link may be accomplished by a Public Switched Telephone Network line supervision driver. Additionally, the step of receiving communication data over a first communication link includes monitoring and controlling ABCD signaling bits accessed via a second T1 framer in accordance with a provisioned line supervision procedure.

In another embodiment, the step of receiving communication data over a first communication link may include receiving a SETUP_IND signal. The step of receiving communication data over a first communication link further includes proceeding in accordance with a provisioned address registration procedure. Additionally, if a DSP resource is required for tone detection and generation, the step of receiving communication data over a first communication link further includes allocating such DSP resource.

In another embodiment, the step of receiving communication data over a first communication link includes the step of receiving a SETUP_CONF signal. The step of receiving communication data over a first communication link further includes acknowledging the line seizure by generating a wink-start or delay-dial signal on a second T1 line. Additionally, if dial pulse registration has been provisioned, PSTN line supervision driver monitors ABCD signaling and reports address digits to PSTN DM using INFO_IND signals.

If tone registration has been provisioned, the method of channel-associated signaling backhaul may include the steps of detecting DTMF tones. Additionally, if tone registration has been provisioned, the method of channel-associated signaling backhaul includes collecting address digits in accordance with a provisioned number plan. Furthermore, when the address information is complete, the method includes the step of signaling SETUP_IND to DMS1 service interface, constructing a SETUP message, and passing called and calling numbers enbloc to a user adaptation layer.

The step of accomplishing a set of steps of transmitting a setup message to a DMS1 service interface and converting DMS1 signals to Q.931 messages and backhauling such messages to a signaling station is accomplished by providing conversion services between a DMS1 service interface and Q.921 service interface. Additionally, this step includes receiving DMS1 signals, converting said signals to Q.931 messages, and passing said messages to a Q.921 user adaptation layer in the form of a DL_DATA_IND event. Furthermore, this step includes converting Q.931 messages received from Q.921 user adaptation layer as DL_DATA_REQ events to DMS1 events and signaling such messages to PSTN DM.

In another embodiment, the step of accomplishing a set of steps of transmitting a setup message to a DMS1 service interface and converting DMS1 signals to Q.931 messages and backhauling such messages to a signaling station is accomplished by PSTN DM. This step includes waiting for DMS1_PROCEED_REQ, DMS1_ALERTING_REQ, and DMS1_CONNECT_REQ signals from Q.921 user adaptation layer via the DMS1 service interface. This step further includes generating call progress tones as necessary, and when the DMS1_CONNECT_REQ signal is received, PSTN DM releases DSP resources and signals call acceptance to the PSTN line supervision driver.

In another embodiment, the step of accomplishing a set of steps of transmitting a setup message to a DMS1 service interface and converting DMS1 signals to Q.931 messages and backhauling such messages to a signaling station is accomplished by signaling completion of call connection via a DMS1 service interface with a DMS1_CONNECT_CONF event which is converted to a Q.931 CONNECT ACKNOWLEDGE message and forwarded to a Q.921 user adaptation layer.

The invention can also be expressed as relating to a data communication system for handling a plurality of signal protocols. The data communication system includes a routing system connected to a first communication network and a second communication network. The routing system is comprised of a media gateway system for setup and teardown of media connections. The routing system is further comprised of an ISDN signaling gateway for generating associated SS7 signals from CAS data. The data communication system further includes an SS7 signaling gateway for interpretation and/or termination of SS7 signals. Additionally, the data communication system includes a first SS7 communication link connecting the SS7 signaling gateway with said first communication network, said first SS7 communication link used for communicating SS7 signaling messages with said first communication network. Finally, the data communication system includes a second SS7 communication link connecting the SS7 signaling gateway with the routing system, where the second SS7 communication link used for communicating SS7 signaling messages generated from the ISDN signaling gateway of the routing system with the SS7 signaling gateway.

In one embodiment of the data communication system, a Public Switched Telephone Network DM operates in concert with hardware and firmware subsystems to implement and manage Public Switched Telephone Network CAS signaling protocols. Additionally, the Public Switched Telephone Network interface connecting the routing system to the communication networks may include a Public Switched Telephone Network line supervision driver as a firmware module that manages supervisory signaling and communicates with Public Switched Telephone Network DM via a communication bus. Furthermore, the Public Switched Telephone Network interface connecting the routing system to the communication networks may include a Public Switched Telephone Network line supervision driver that interfaces directly with a second T1 framer to monitor and manipulate line supervisory signals.

In another embodiment, the data communication system is configured to support one or more line engagement procedures selected from the group consisting of immediate start, wink start, and delay-dial delay start.

In another embodiment, the data communication system is configured to operate such that once a line is seized, a Public Switched Telephone Network DM commences with register signaling through the detection and generation of dual tone multi-frequency tones in the media stream. Furthermore, generation of dual tone multi-frequency tones in the media stream includes the steps of requesting a DSP resource requested from DSPRM via an IPC link, as required, and connecting to the dial endpoint by SMS through an exchange of primitives via the IPC link. Additionally, the call progress signals may also be generated using the same DSP. In another embodiment, within the routing system connecting the data communication system with the communication networks, the Public Switched Telephone Network interface uses call control primitives supported by Integrated Services Digital Network DM.

In another embodiment, the data communication system comprises a Call Manager that operates independently of the type of signaling being performed by Integrated Services Digital Network DM and Public Switched Telephone Network DM. In yet another embodiment, the data communication system is configured to restrict network signaling dependencies to the corresponding dial managers.

4. DETAILED DESCRIPTION OF THE INVENTION

The invention provides a system and method of performing channel associated signaling (CAS) backhaul of non-ISDN formatted signals in an ONG routing system. The invention advantageously reduces the complexity of a routing system and provides a way to easily scale the configuration of routing systems. Moreover, the invention provides a means for supplying an ONG system to networks that do not have dedicated SS7 signaling. The invention flexibly provides the user with the ability to use any number of signaling protocols, i.e., R2, Robbed-bit, T1, and P7, and also permits the use of legacy signaling in an ONG model.

4.1 Overview of Routing System Application

Figure 1:
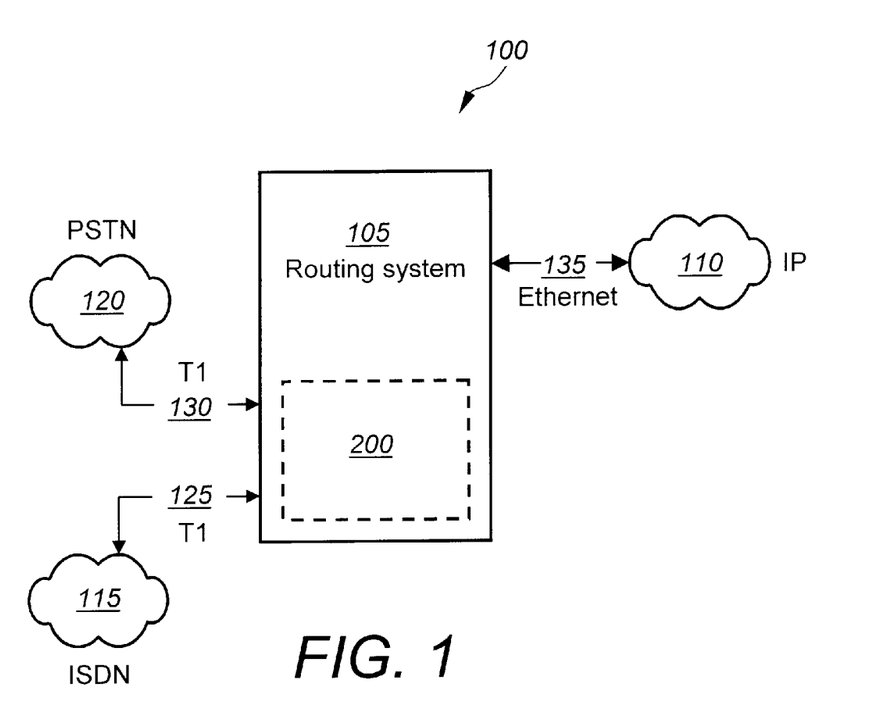

FIG. 1 shows an overview of a routing system application 100, including a routing system 105, a first T1 line 125, a second T1 line 130, an Ethernet link 135, an Integrated Services Digital Network (ISDN) 115 network interface, a Public Switched Telephone Network (PSTN) 120 network interface, and an Internet Protocol (IP) 110 network interface.

Routing system 105 is a signal processing assembly that switches, processes, and routes call media signals from one destination to another. Further, routing system 105 is connected to ISDN 115 network interface via first T1 line 125, to PSTN 120 network interface via second T1 line 130, and to IP 110 network interface via Ethernet link 135. Call management system 200 is an embedded call processing system shown for system clarity and is described in detail in FIG. 2.

First T1 line 125 is shown as an example of a typical communication line. However, many different types of communication lines may be used, e.g., E1, DL2, or T3. First T1 line 125 consists of up to 24 channels. Multiple channels may carry specific information in reference to a particular call signal. Other first T1 line 125 channels carry data and other associated signal information. Further, first T1 line 125 is a conventional ISDN communication link used in transferring digital data signals from ISDN network interface 115 to routing system 105. Second T1 line 130 is similar to first T1 line 125 in configuration and function.

Ethernet link 135 is a conventional communication link used to transfer signal data from routing system 105 to IP 110 network interface.

4.2 Call Management System

Figure 2:
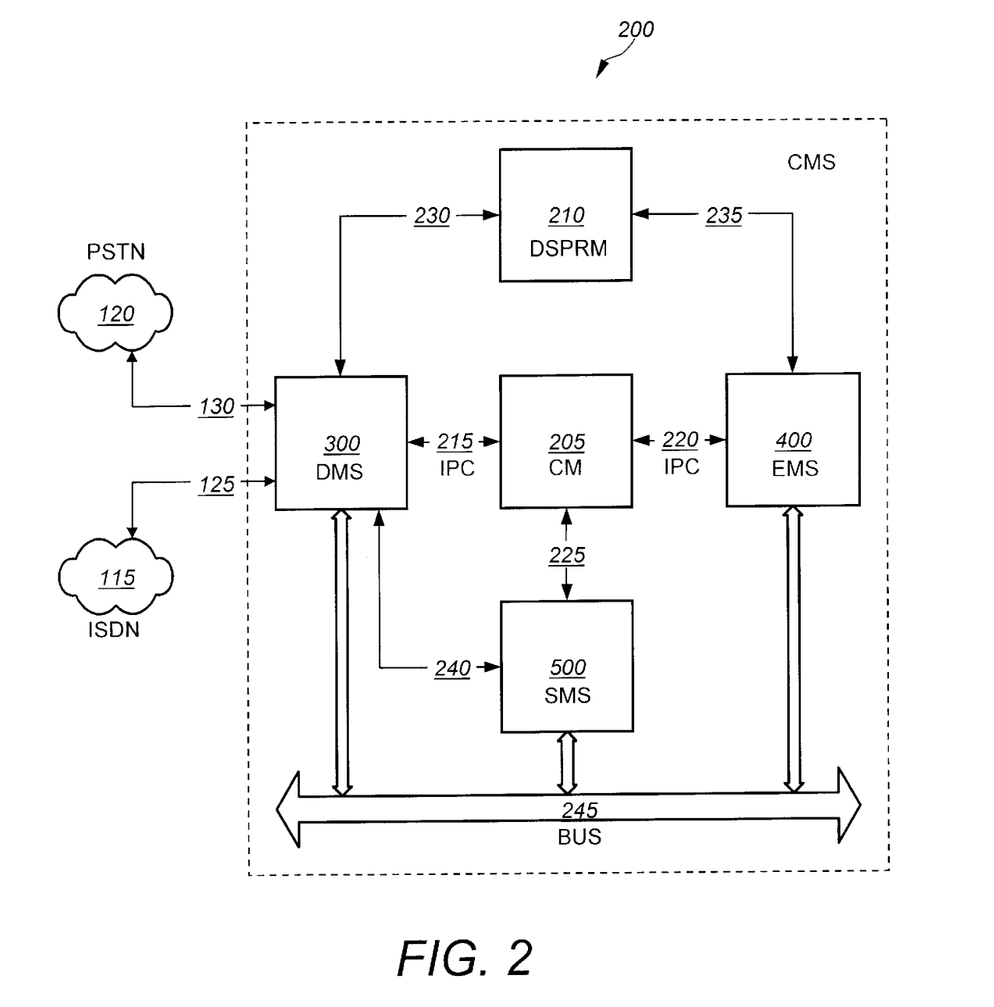

FIG. 2 shows a block diagram of a call management system (CMS) 200, including a call manager (CM) 205, a DSP resource manager (DSPRM) 210, a dial management subsystem (DMS) 300, an endpoint management subsystem (EMS) 400, and a switching management subsystem (SMS) 500. A high-speed digital bus (such as a PCI bus) 245 interconnects the hardware components of DMS 300, EMS 400, and SMS 500.

An interprocess communication (IPC) link 215, an IPC link 220 and an IPC link 225 interconnect call manager 205 with DMS 300, EMS 400, and SMS 500, respectively. An IPC link 230 and an IPC link 235 interconnect DSPRM 210 with DMS 300 and EMS 400, respectively. All IPC links used by CMS 200 are message-based inter-process communication links implemented entirely in software. Only control information is transferred over IPC links, and in particular, no media signals are transferred via these links.

CM 205 is a software module located inside CMS 200 and is the central call agent for all circuit-switched calls arriving at, or originating from, routing system application 100. Using the services of DMS 300, EMS 400, and SMS 500, CM 205 establishes, maintains, and tears down switched circuits upon command suitable for the transport of media processed by routing system 105.

DMS 300 is a hardware and software module implementing call signaling protocols appropriate for ISDN 115 network interface and PSTN 120 network interface.

In operation, incoming call signals are received over first T1 line 125 and second T1 line 130 by DMS 300, are analyzed and checked for validity, and when appropriate, are reformatted and forwarded to CM 205 for further processing via IPC link 215. The dial endpoint receiving the call request is identified to CM 205, which in turn, makes a decision whether to accept or reject the call request based on the signaling information provided and the current conditions of the system. Message-based signals are returned to DMS 300, which in turn are reformatted and forwarded to ISDN 115 network interface or PSTN 120 network interface using the appropriate T1 line. Several signaling interchanges between DMS 300 and CM 205 may be required to fully establish a call.

The point of ingress or egress of a circuit-switched call is referred to throughout this text as a "dial endpoint". In the example presented in FIG. 2, a dial endpoint identifies first T1 line 125 or second T1 line 130, in addition to the T1 channel carrying the media payload, i.e., the dial endpoint identifies one endpoint of a media stream within CMS 200.

In continuing reference to FIG. 2, if CM 205 chooses to accept a call request from DMS 300, it must determine how to route the call using internal tables and database entries. In some cases, the media stream may be switched to a different T1 line and channel for egress to another routing system. More commonly, however, the media stream will be terminated and transformed into a format that can be processed by routing system 105. For example, if routing system application 100 is a network access system (NAS), the media stream must be converted into a point-to-point protocol (PPP) packet stream using a digital modem or high-level data link controller (HDLC). If routing system application 100 is a voice-over-IP (VoIP) gateway, the media stream must be converted into a real-time transport protocol (RTP) packet stream using an appropriate coder-decoder (codec). In most cases, a digital signal processor (DSP) is assigned for this purpose. The DSP or HDLC controller resource that terminates the media steam is referred to as a "terminal endpoint".

EMS 400 is a hardware and software module located inside CMS 200 responsible for assigning, maintaining, and relinquishing terminal endpoints. When CM 205 requires a terminal endpoint of a certain type, a message-based signal is sent to EMS 400 using IPC link 220. EMS 400 determines the type of terminal endpoint requested, assigns the appropriate resources, and returns its identity using IPC link 220. Subsequent message-based signaling is exchanged between CM 205 and EMS 400 as call setup progresses in order to configure the terminal endpoint and to modify and monitor its operation. A final message-based signal is sent during call disconnect to release the terminal endpoint and to return allocated resources to an available pool.

SMS 500 is a hardware and software module located inside CMS 200 responsible for establishing a path between a dial endpoint and terminal endpoint, or between two dial endpoints, over which a media stream may flow. Generally, this path consists of a pulse code modulation (PCM) channel transported over a global time-division multiplexing (TDM) interconnect bus that is an integral part of SMS 500. CM 205 sends message-based signals to SMS 500 via IPC link 225 at the appropriate time to connect or disconnect the endpoints.

DSPRM 210 is a software module located inside CMS 200 responsible for maintaining a pool of physical and logical DSP resources, mapping logical DSP profiles onto physical DSPs, and allocating logical DSP resources to call management entities that require them. For example, as EMS 400 requires a terminal endpoint of a certain type that can be satisfied by a logical DSP resource, a message-based signal is sent to DSPRM 210 via IPC link 235. The identity of the logical DSP is returned to the requester via the same IPC link. Similar message-based signals are exchanged when EMS 400 no longer requires the DSP resource.

DSPRM 210 may also provide DSP resources to DMS 300 to be used as tone generators and detectors for certain PSTN signaling protocols. These resources are used to generate and detect address registration and call progress signals during call setup and tear down sequences. Requests to assign and relinquish DSP resources are communicated via IPC link 230. Requests to establish and release a path between the DSP and a dial endpoint are sent by DMS 300 to SMS 500 via IPC link 240.

The example discussed above was that of an incoming call presented to CM 205 via DMS 300. CM 205 may also originate outgoing calls via DMS 300. In this case, information flows of call setup signals are reversed. The interactions among CM 205, EMS 400, and SMS 500 are substantially the same.

4.3 Dial Management Subsystem

Figure 3:
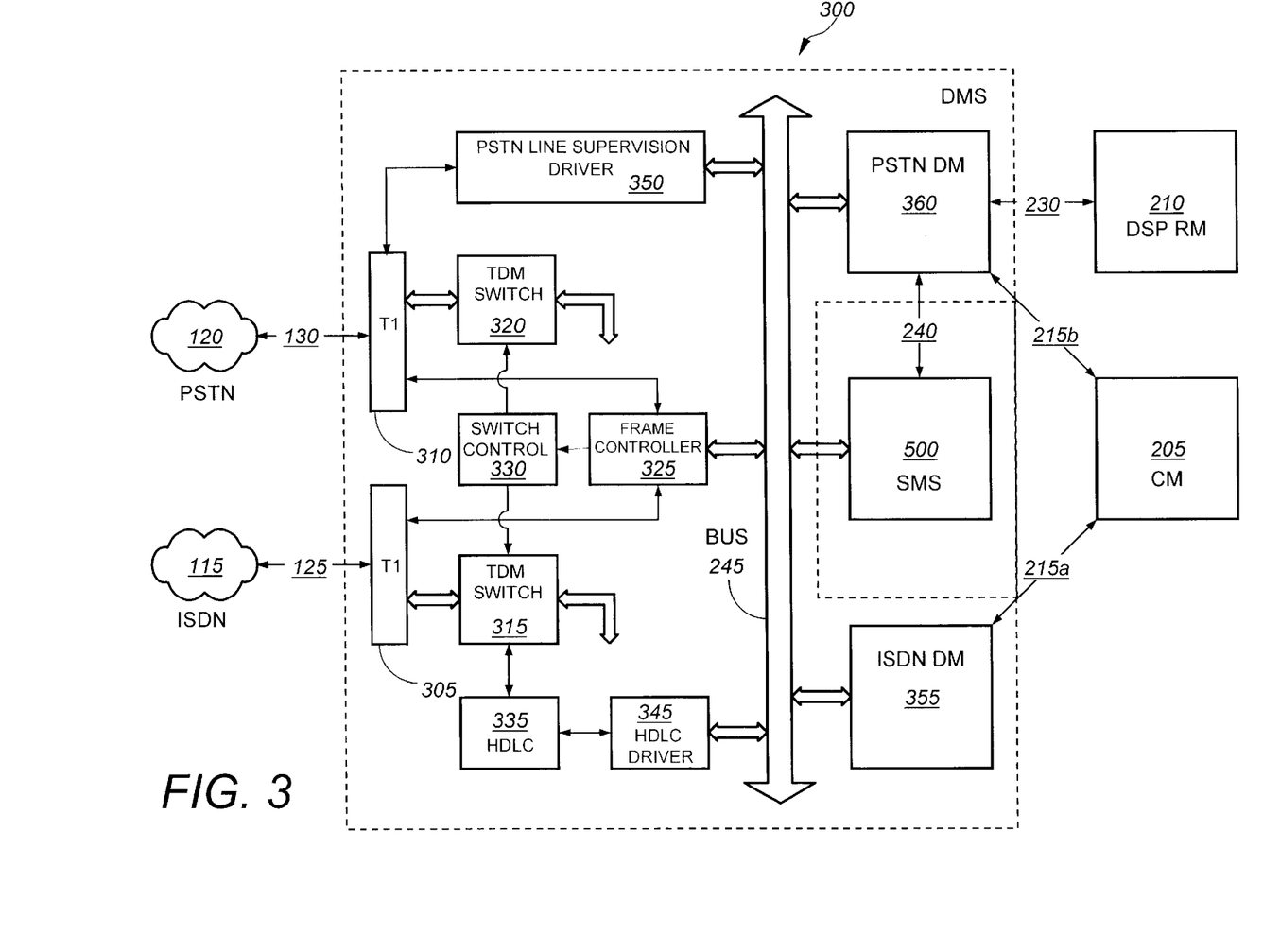

FIG. 3 shows a block diagram of DMS 300, including an ISDN dial manager (ISDN DM) 355, a PSTN dial manager (PSTN DM) 360, and various hardware and firmware subsystems. The latter hardware and firmware subsystems reside on feature cards that are mechanically and electrically connected to high-speed digital bus (such as a PCI bus) 245, and can be removed from DMS 300 and replaced by similar feature cards without removing power, and without affecting the rest of the system. ISDN DM 355 and PSTN DM 360 co-reside with CM 205 on a control card that is also connected to high-speed digital bus (such as a PCI bus) 245.

Multiple feature cards can be installed in DMS 300, and a given feature card may support many T1 lines. For simplicity, two T1 lines are shown in FIG. 3. In this case the feature card consists of a first T1 framer 305, a second T1 framer 310, a first TDM switch 315, a second TDM switch 320, a T1 framer control 325, a TDM switch control 330, an HDLC controller 335, an HDLC driver 345, and a PSTN line supervision driver 350.

In operation, under control of T1 framer control 325, first T1 framer 305 and second T1 framer 310 synchronize with the T1 signal, detect T1 frames, and de-multiplex TDM channels that are subsequently routed to first TDM switch 315 and second TDM switch 320, which in turn can selectively switch TDM channels to on-board or off-board resources. In this example, first T1 line 125 is connected to first T1 framer 305, and time-slot 16 (D-channel on primary-rate ISDN 115 network interface) is switched by first TDM switch 315 to HDLC controller 335. Link access protocol-D channel (LAPD) frames are extracted by HDLC controller 335 and can be accessed via HDLC driver 345.

First T1 framer 305 and second T1 framer 310 can also access and manipulate embedded operation channels carried within the T1 bit stream. In this example, AB and ABCD bits are accessed and manipulated by PSTN line supervision driver 350.

ISDN DM 355 is a software module that implements layers 2 and 3 of ISDN signaling protocol, and manages layer 1 as implemented in the hardware subsystems described above. The generic requirements of layer 2 are defined by ITU-T Recommendation Q.921, and the generic requirements of layer 3 are defined by ITU-T Recommendation Q.931. Most national central-office switch variants of these protocols are supported. ISDN DM 355 also contains a call-control layer that hides many of the idiosyncrasies inherent in these national variants so that the application layer, sitting above it, is presented with a common interface.

ISDN DM 355 receives and sends LAPD packets to HDLC driver 345 via high-speed digital bus (such as a PCI bus) 245. Information frames are extracted from the LAPD packet stream and forwarded to layer 3 for processing, and outgoing messages received from layer 3 are inserted into the LAPD packet stream, which are subsequently delivered via first T1 line 125 to ISDN 115 network interface. A Q.931 state machine that recognizes all Q.931 call states sequences events occurring at layer 3. Valid events are forwarded to the ISDN call control layer for presentation to the client application, in this case, CM 205 via IPC link 215a.

The service and presentation interface used by DMS 300 is based on the call control primitives appearing in Specification Description Language (SDL) diagrams for DSS1 layer-3 protocol control, International Telecommunications Union Telecommunication Standardization Sector (ITU-T) Recommendation Q.931. In this case, the important parameters of DSS1 information elements are extracted and reformatted into fixed-length data structures that can be more easily and efficiently interpreted by CM 205 (this presentation interface is referred to as DMS1 throughout the remainder of this text): DM, since it is used to access a dial manager, and S1 since it is based on DSS1. DMS1 is message-based and readily communicated via an interprocess communication link such as IPC link 215a.

In service areas where ISDN is not supported, or ISDN tariffs are unfavorable, legacy PSTN signaling protocols are used. In North America a combination of robbed-bit signaling (RBS) and region 1 (R1) signaling may be used, and outside of North America, region 2 (R2) signaling is widely used. As is the case with ISDN, there are national variants of these signaling protocols.

RBS, R1, and R2 belong to a class of signaling protocols referred to as channel-associated signaling (CAS), whereas ISDN is characterized as common channel signaling (CCS). Unlike ISDN, which is message-based and transported over a dedicated signaling channel, CAS signaling is either carried in the media channel itself (e.g., T1), or in a separate but associated sub-channel (e.g., E1). A characteristic of CAS signaling is that it is not easily separated from the media path.

PSTN DM 360 is a software module that, in concert with hardware and firmware subsystems, implements and manages the PSTN CAS signaling protocols mentioned above. PSTN line supervision driver 350 is a firmware module that manages supervisory signaling (i.e., line seizure, line release) and communicates with PSTN DM 360 via high-speed digital bus (such as a PCI bus) 245 using a small, well-defined set of driver primitives. PSTN line supervision driver 350 interfaces directly with second T1 framer 310 for the purpose of monitoring and manipulating line supervisory signals. A broad repertoire of line engagement procedures is supported, including immediate start, wink start, and delay-dial delay start. These procedures are table-driven to accommodate national and regional variations.

Once a trunk (i.e., line) has been seized, PSTN DM 360 commences with register (address) signaling through the detection and generation of dual tone multi-frequency (DTMF or MF) tones in the media stream. This requires a DSP resource requested from DSPRM 210 via LPC link 230, and subsequently connected to the dial endpoint (media channel) by SMS 500 through a simple exchange of primitives via IPC link 240. Call progress signals may also be generated using the same DSP. Parameterized DTMF and MF tone tables are used to accommodate national and regional variations.

An important feature that is key to the invention is that PSTN DM 360 hides the idiosyncrasies of PSTN signaling from CM 205 by using the same call control primitives supported by ISDN DM 355. For example, wink start line seizure may occur, followed by address registration, before any indication is sent to CM 205. When the called and calling numbers have been registered, only then would PSTN DM 360 format a DMS1 message and send a call establishment (or enbloc) SETUP indication to CM 205 via IPC link 215*b*. Overlap address signaling is supported, but generally not required since routing system application 100 typically terminates, rather than switches, incoming calls. The salient point is that CM 205 operates independent of the type of signaling being performed by ISDN DM 355 and PSTN DM 360, and that network signaling dependencies are restricted to the corresponding dial managers.

4.4 Endpoint Management Subsystem

Figure 4:
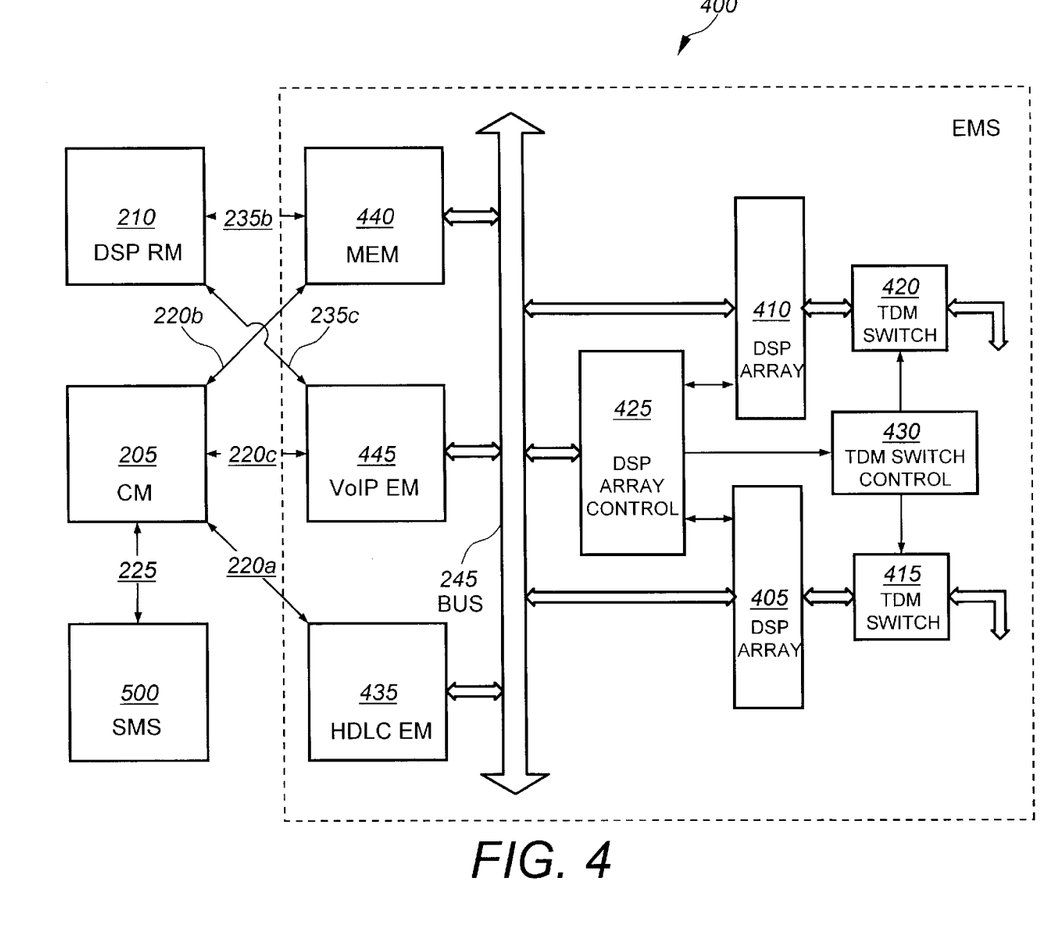

FIG. 4 shows a block diagram of EMS 400, including a HDLC endpoint manager (HDLC EM) 435, a modem endpoint manager (MEM) 440, a VoIP endpoint manager (VoIP EM) 445, and various hardware and firmware subsystems. The latter hardware and firmware subsystems reside on feature cards that are mechanically and electrically connected to high-speed digital bus (such as a PCI bus) 245, and can be removed from EMS 400 and replaced by similar feature cards without removing power, and without affecting the rest of the system. HDLC EM 435, MEM 440, and VoIP EM 445 co-reside with CM 205 on a control card that is also connected to high-speed digital bus (such as a PCI bus) 245.

Multiple feature cards can be installed in EMS 400, and may be integrated with DMS 300. For simplicity, EMS 400 is shown as a non-integrated subsystem. Additionally, since this subsystem manages terminal endpoints, it might be more appropriate to use the label terminal endpoint management subsystem. For simplicity, the word "terminal" is dropped, and is implied by context.

The balance of hardware and firmware that comprise EMS 400 includes a first DSP array 405, a second DSP array 410, a first TDM switch 415, a second TDM switch 420, a DSP array control 425, and a TDM switch control 430. For simplicity, only two DSP arrays are shown, but many more may be present.

The fundamental job of EMS 400 is to manage a pool of terminal endpoints. This includes dynamically assigning an available endpoint to a call based on the type of service required, configuring the endpoint to provide the requested service, maintaining the endpoint in an operational state while the call is connected, and releasing the endpoint when the call is finally terminated. In some cases the endpoint is a discrete device, such as an HDLC framer, that is capable of performing a particular type of service. Generally, however, the terminal endpoint is comprised of a DSP acquired from DSPRM 210. In this case, EMS 400 must load the appropriate firmware onto the DSP in order to provide the desired service.

The function of a terminal endpoint is to transform the media stream into a format that can be processed by routing system 105. If routing system application 100 is a network access system (NAS), then the terminal endpoint usually converts the media stream into a framed PPP packet stream. In this case the media stream may be unrestricted digital information formatted as synchronous HDLC frames, asynchronous V.110 rate-adapted characters, or a modem signal modulated according to industry standards such as V.90, V.34 or V.32. On the other hand, if routing system application 100 is a VoIP gateway, then the terminal endpoint must be set up to transform pulse-code modulation (PCM)-encoded speech into RTP packets using a variety of voice compression standards.

CM 205 selects the appropriate endpoint manager based on certain criteria derived from call setup information, internal routing tables, external authorization servers, and the type of dial endpoint. HDLC EM 435 handles legacy devices containing discrete HDLCs, whereas MEM 440 handles any type of NAS data call, utilizing a DSP (digital modem, V.110 or HDLC). VoIP EM 445 handles all VoIP and fax-over-IP (FoIP) calls. All three endpoint managers communicate with their client, CM 205, using IPC link 220*a*, IPC link 220*b*, and IPC link 220*c*. MEM 440 and VoIP EM 445 communicate with DSPRM 210 using IPC link 235*b* and IPC link 235*c*, respectively. Only control information is transferred over IPC links, and in particular, no media signals are transferred via these links.

CM 205 communicates with EMS 400 using a proprietary service interface that is independent of the type of call setup signaling being used by DMS 300. Although EMS 400 may generate a call progress signal on a media stream, or detect DTMF digits, this is only done at the direction of CM 205, and in a manner that does not depend on any direct interpretation of ISDN or PSTN signaling protocols.

4.5 Switching Management Subsystem

Figure 5:
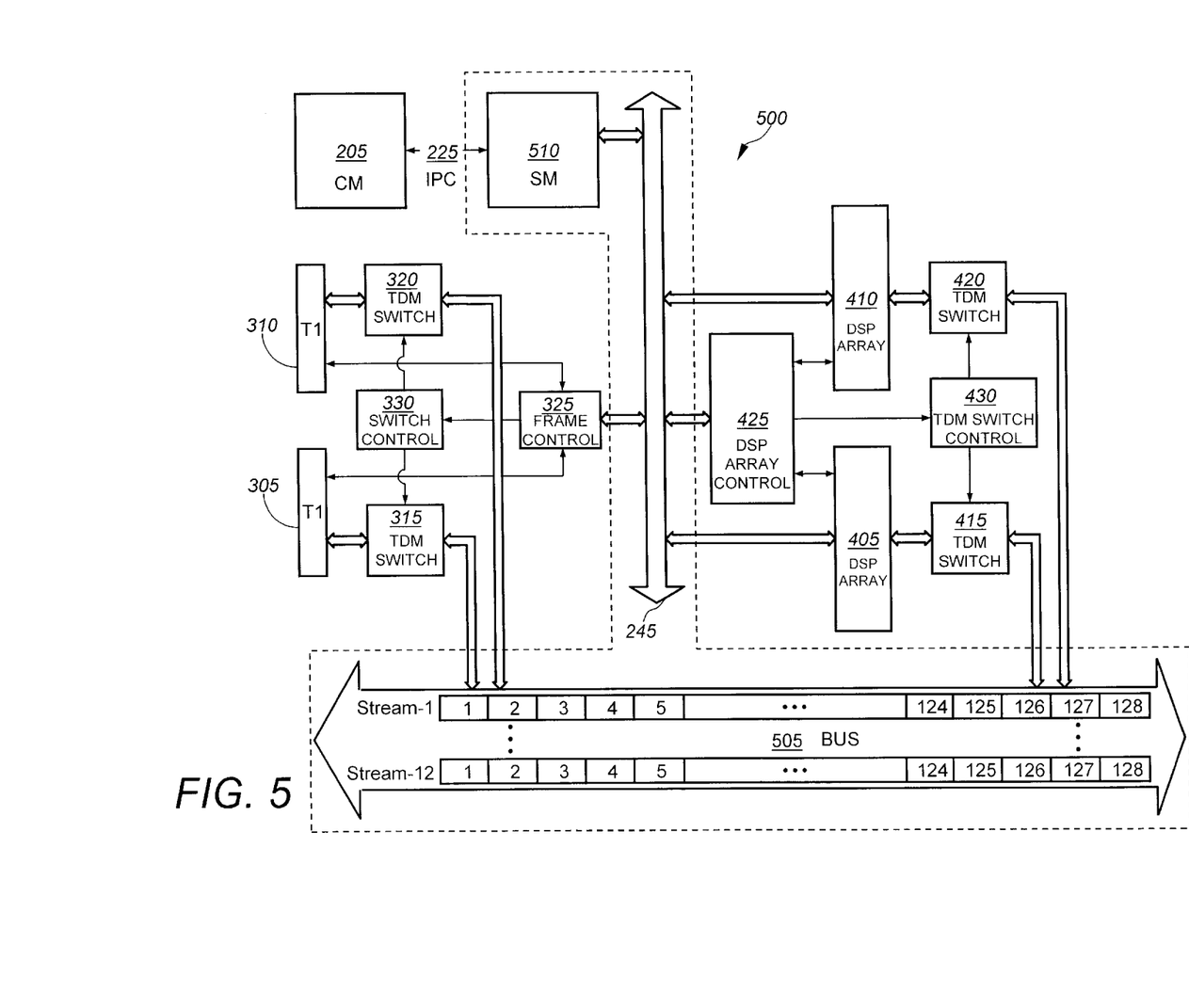

FIG. 5 shows a block diagram of SMS 500, including a switching manager (SM) 510 and an H-MVIP TDM interconnect bus 505. SM 510 communicates with CM 205 via EPC link 225, and is connected to DMS 300 and EMS 400 via high-speed digital bus (such as a PCI bus) 245.

H-MVIP TDM interconnect bus 505 is an industry standard, high-capacity TDM bus based on Multi-Vendor Integration Protocol (MVIP). H-MVIP TDM interconnect bus 505 configured at its full capacity can support up to 3072 64-Kbps time-slots arranged as 12 bi-directional streams consisting of 128 time-slots each.

SM 510 provides switching services to CM 205 via simple control primitives communicated over IPC link 225. When commanded to do so, SM 510 connects the indicated dial endpoint with the indicated terminal endpoint, or in some cases, another dial endpoint. It does this by dropping the appropriate time-slot at the source TDM switch (e.g., first TDM switch 315 or second TDM switch 320) onto an available time-slot in a selected stream on H-MVIP TDM interconnect bus 505, and then inserting this time-slot into the desired time-slot at the destination TDM switch (e.g., first TDM switch 415 or second TDM switch 420). When the connection is no longer required, CM 205 instructs SM 510 to release the connection.

SM 510 may also provide switching services to PSTN DM 360 (FIG. 3) for purposes of temporarily connecting a DSP during call setup used for tone generation and detection in support of PSTN signaling protocols. In this case, control primitives are sent via IPC link 240.

4.6 Open Network Gateway

Figure 6:
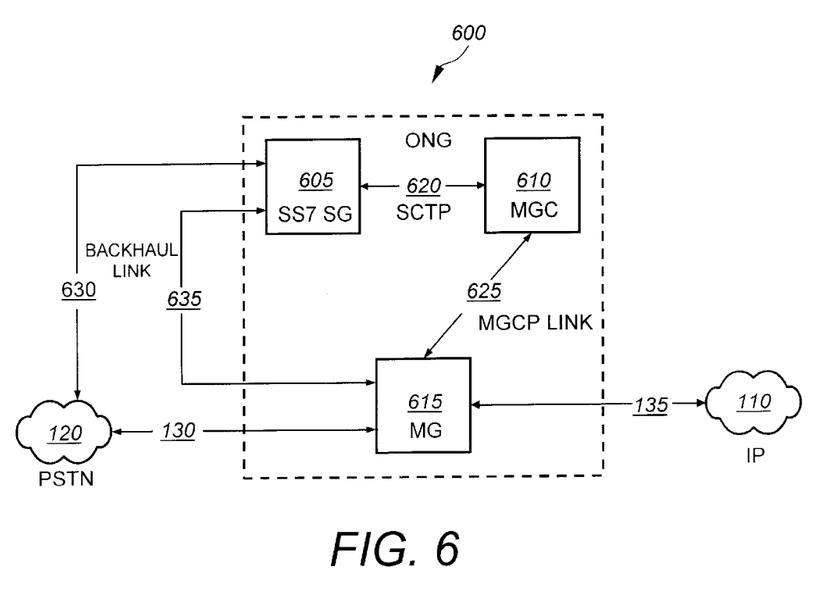

FIG. 6 is a diagram of an open network gateway (ONG) 600 based on the IETF/ITU-T model of a decomposed switch. Open network gateway 600 includes a SS7 signaling gateway (SG) 605, a media gateway controller (MGC) 610, a media gateway (MG) 615, a stream control transport protocol (SCTP) link 620, a media gateway control protocol (MGCP) link 625, a signaling link 630, and a backhaul link 635. MGC 610 is capable of controlling more than one media gateway; for simplicity, only one media gateway is shown.

SS7 signaling gateway 605 is a hardware module containing software protocols that terminates signaling link 630, and receives non-associated SS7 signaling messages from PSTN 120 network interface. SS7 is the preferred PSTN signaling protocol since it is available in most developed countries throughout the world, and possesses the scalability, robustness, and service features necessary to support very large, reliable networks. ISDN User Part (ISUP) signaling messages are transmitted over signaling link 630 using message transfer part (MTP) layers 1, 2, and 3.

ISUP signaling messages received by SS7 signaling gateway 605 are forwarded to MGC 610 over SCTP link 620 using MTP layer-3 user adaptation (M3UA) and SCTP developed by the Sigtran working group of IETF. SCTP provides reliable, sequenced delivery of packets within multiple streams over a conventional user datagram protocol (UDP) link. SCTP provides the reliability of transmission control protocol (TCP) while avoiding many of its limitations.

MGC 610 is a hardware module containing software protocols and is connected to SS7 signaling gateway 605 via SCTP link 620, and to MG 615 via MGCP link 625. MGC 610 performs complex software functions to determine the appropriate routing and processing of call signals received from SS7 signaling gateway 605, and is the primary call agent for ONG 600. MGC 610 determines the destination endpoint on MG 615 and sets up network connections by sending MGCP messages via MGCP link 625. Alternatively, MGC 610 may use H.248 protocol if MG 615 supports it. H.248 was co-developed by the Megaco working group of IETF and Study Group 16 of ITU-T.

MG 615 is a hardware module containing software protocols that is connected to and controlled by MGC 610 via MGCP link 625. MG 615 is also connected to PSTN 120 network interface via T1 line 130, and to IP 110 network interface via Ethernet link 135. Typically, MG 615 will have many T1 lines connected to PSTN 120 network interface; for simplicity, only one is shown.

MG 615 sets up network connections to remote destinations in response to commands received from MGC 610 over MGCP link 625. Once such connections have been established, it is the responsibility of MG 615 to terminate the associated media channels on T1 line 130, adapt the media for IP network transfer as directed by MGC 610, and forward the adapted media towards the proper destination on IP 110 network interface using Ethernet link 135. Because most of the complex call control functions have been transferred to MGC 610, the job of MG 615 has been simplified by a commensurate amount. Further, ONG 600 can be scaled to handle large numbers of connections without replicating call control functionality in each media gateway. For reliability and redundancy, MG 615 can be controlled by more than one MGC 610.

In some service areas, associated SS7 signaling is used, and the signaling messages are transported over the same T1 line carrying the media. In this case, associated signaling received by MG 615 must be backhauled to SS7 signaling gateway 605 via backhaul link 635. This is facilitated by simply dropping and inserting the SS7 signaling channel on T1 line 130 into a time-slot on backhaul link 635, which is also a T1 line. Because drop and insert is used, it is not necessary for MG 615 to terminate or interpret any SS7 signaling protocols.

4.7 Routing System Application in an Open Network Gateway

Figure 7:
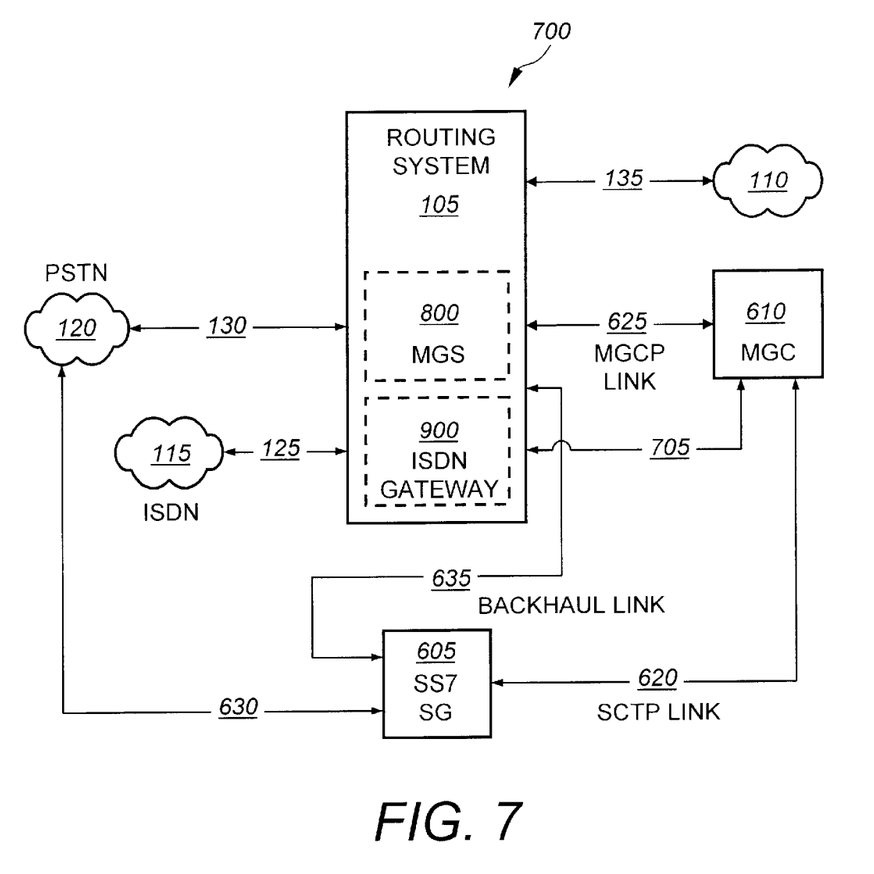

FIG. 7 is a block diagram of a routing system application 700, which is routing system application 100 rendered as a media gateway as it would appear in open network gateway 600. Routing system 105 is unchanged, but CMS 200 has been replaced by media gateway system (MGS) 800, and ISDN signaling gateway 900 has been added. Second T1 line 130 connects routing system application 700 to PSTN 120 network interface, which has been configured to use SS7 signaling. SS7 signaling gateway 605, MGC 610, SCTP link 620, MGCP link 625, signaling link 630, and backhaul link 635 are shown for completeness. Additionally, first T1 line 125 connecting ISDN 115 network interface finishes the diagram, and a new SCTP link 705 is added.

MGS 800 performs the functions of a media gateway in the context of open network gateway 600, and is discussed in further detail below.

ISDN signaling gateway 900 provides backhaul of ISDN signaling in service areas where SS7 signaling is not available, or in legacy networks that have not been upgraded. From an architectural view, ISDN signaling gateway 900 performs similar services as SS7 signaling gateway 605 in ONG 600, but for ISDN signaling. Further, rather than being an external module, it is embedded within MG 615. ISDN signaling messages received by ISDN signaling gateway 900 are forwarded to MGC 610 over SCTP link 705 using ISDN layer-2 (Q.921) user adaptation (IUA) and stream control transport protocol (SCTP). ISDN signaling gateway 900 is discussed in further detail below.

4.8 Media Gateway System

Figure 8:
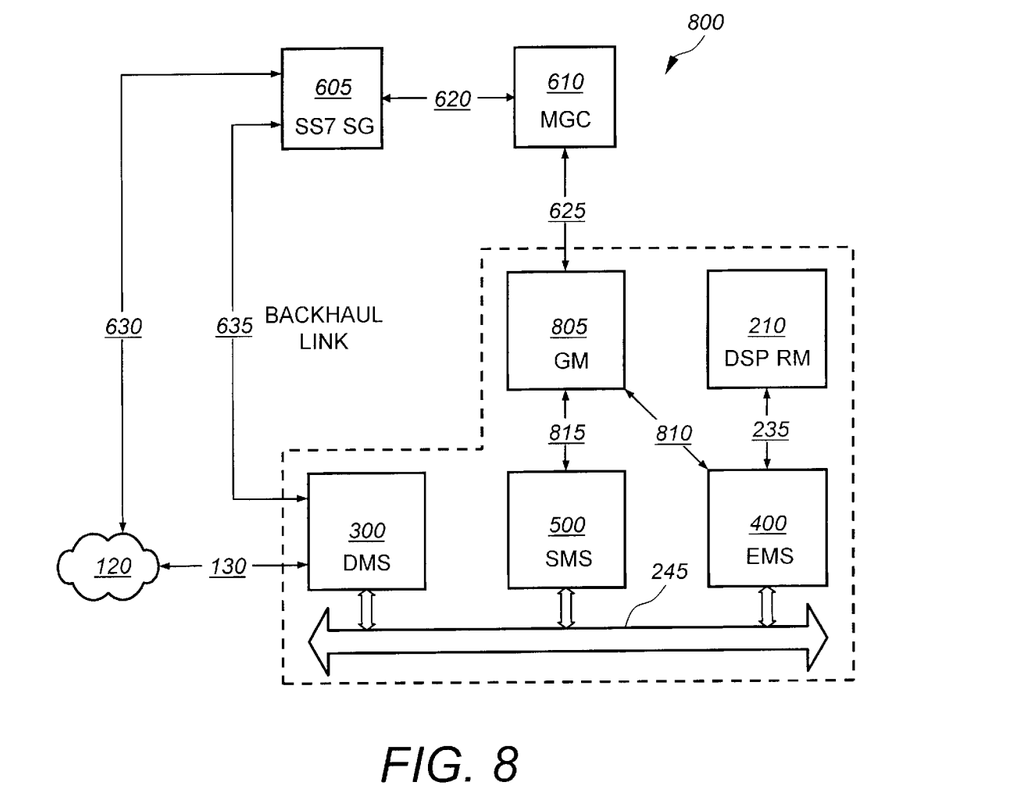

FIG. 8 shows MGS 800 in more detail so it can be related to CMS 200 in FIG. 2. All of the components of CMS 200 also appear in MGS 800 except CM 205, which has been replaced by a gateway manager (GM) 805.

The complexity of MGS 800 has been reduced. First, many of the complex procedures performed by CM 205 have been moved to MGC 610, and GM 805 merely responds to simple MGCP (or H.248) commands received over MGCP link 625 in order to set up and tear down media connections. Second, DMS 300 is no longer required to interpret complex call signals as these are being routed to SS7 signaling gateway 605, either directly via signaling link 630, or indirectly via backhaul link 635.

GM 805 communicates with EMS 400 via an IPC link 810, and with SMS 500 via an IPC link 815 using the same control primitives as CM 205. There is no need for GM 805 to communicate with DMS 300. DSPRM 210, EMS 400, SMS 500, and high-speed digital bus (such as a PCI bus) 245 are unchanged.

4.9 ISDN Signaling Gateway

Figure 9:
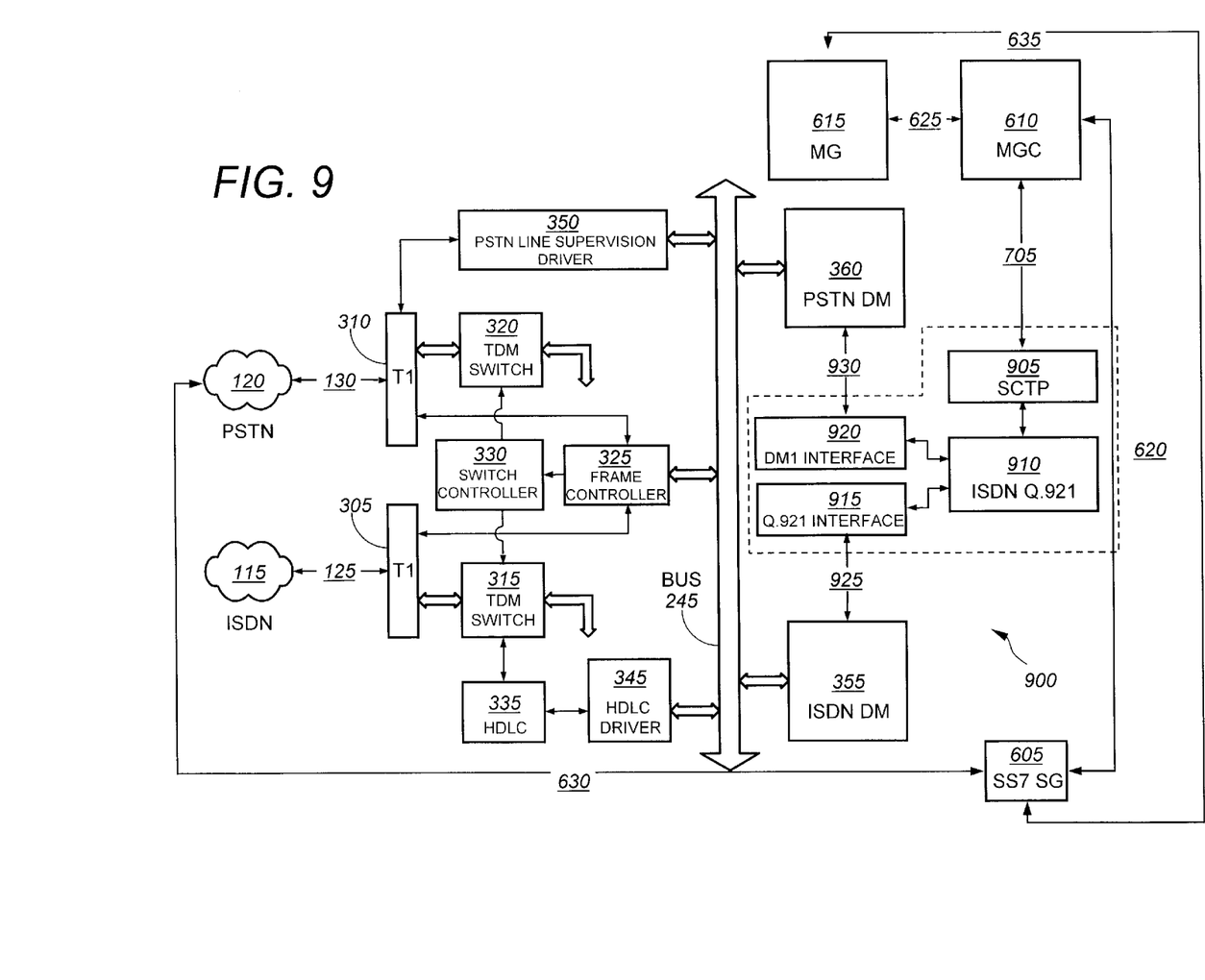

FIG. 9 shows a block diagram of ISDN signaling gateway 900, including an SCTP transport service 905, an ISDN Q.921 user adaptation layer 910, a Q.921 service interface 915, a DMS1 service interface 920, an IPC link 925, and an IPC link 930. The remaining components shown in FIG. 9 have already been described in the text above.

In service areas where SS7 signaling is not available or not desired, ONG 600 must support ISDN or legacy PSTN signaling protocols. However, in order to minimize the burden on MG 615, as much of the signaling that is reasonable and possible is backhauled to MGC 610. This backhaul function becomes another type of signaling gateway in the context of ONG 600 that just happens to be embedded within the physical media gateway.

When ISDN signaling protocol is being used, it is associated with first T1 line 125 and routed through first T1 framer 305, first TDM switch 315, HDLC controller 335, and HDLC driver 345 to arrive at ISDN DM 355. As described above, ISDN DM 355 is a software module consisting of multiple layers of ISDN protocol with standards-based service layers between each layer of protocol. The layer above accesses services provided by the layer below using a well-defined set of service primitives. In this case layer-3 protocol control (Q.931) accesses the layer-2 datalink (Q.921) carrying D-channel signaling messages using primitives defined by the Q.921 service layer.

When ISDN signaling is backhauled, layer-3 protocol control resides in MGC 610, which interprets and processes the Q.931 signaling messages received via SCTP link 705. The Q.921 LAPD data link that carries these signaling messages resides and terminates in MG 615 (i.e., ISDN signaling gateway 900). Thus, the gap between ISDN layer-2 and ISDN layer-3 must be bridged by the signaling backhaul protocols. The Sigtran working group of IETF has developed a set of open protocols for this purpose, and a software implementation of these are included in ISDN signaling gateway 900.

SCTP transport service 905 is a software module providing reliable transport services for backhaul signaling via SCTP link 705. This software module contains an implementation of stream control transport protocol (SCTP). On each side of SCTP link 705 there must be a Q.921 user adaptation layer. User adaptation layer 910 is a software implementation of that protocol residing in ISDN signaling gateway 900. User adaptation layer 910 inserts itself into the ISDN stack via Q.921 service interface 915, which is a client implementation of the Q.921 service interface. Q.921 service interface 915 communicates with ISDN DM 355 via IPC link 925. Thus, ISDN signaling gateway 900 takes over control of the ISDN signaling channel and layer-3 protocol control remains dormant in ISDN DM 355.

FIG. 9 illustrates a method of CAS backhaul when ONG 600 is connected to PSTN 120 network interface via second T1 line 130 and SS7 signaling is not available.

CAS signaling is associated with individual media channels on second T1 line 130 and embedded in the media stream in the form of line supervision signaling (e.g., RBS) and register signaling (e.g., DTMF tones). PSTN line supervision driver 350 monitors and manipulates line supervision signals and interfaces to PSTN DM 360 via high-speed digital bus (such as a PCI bus) 245. Register signaling carried in the media stream is routed through second TDM switch 320 onto H-MVIP TDM interconnect bus 505, and eventually to a DSP resource in second DSP array 410 via second TDM switch 420 (see FIG. 5 showing SMS 500). PSTN DM 360 can access the DSP resource via high-speed digital bus (such as a PCI bus) 245, and is the interpreter of and responder to CAS protocol signals received via these means.

PSTN DM 360 is a software module containing a call control state machine that mimics Q.931 call states, and was originally designed to interface to CM 205 via a DMS1 service interface over IPC link 215b (see FIG. 3 showing DMS 300). For purposes of backhauling PSTN channel-associated signaling in the context of ONG 600, DMS1 service interface 920 exchanges DMS1 signaling messages with PSTN DM 360, and converts these to/from Q.931 messages that are compatible with ISDN Q.921 user adaptation layer 910. Thus, it appears to MGC 610 as if it were connected to a real ISDN signaling gateway.

Some ISDN supplementary services will not be available or supported by this backhaul methodology, and it is important that MGC 610 be provisioned to not use them based on number analysis. However, support for normal PSTN voice, fax modem, and data modem calls can be provided in a transparent and seamless manner by mimicking ISDN signaling backhaul.

4.10 Method of Signaling Backhaul in a Routing System

Figure 10:
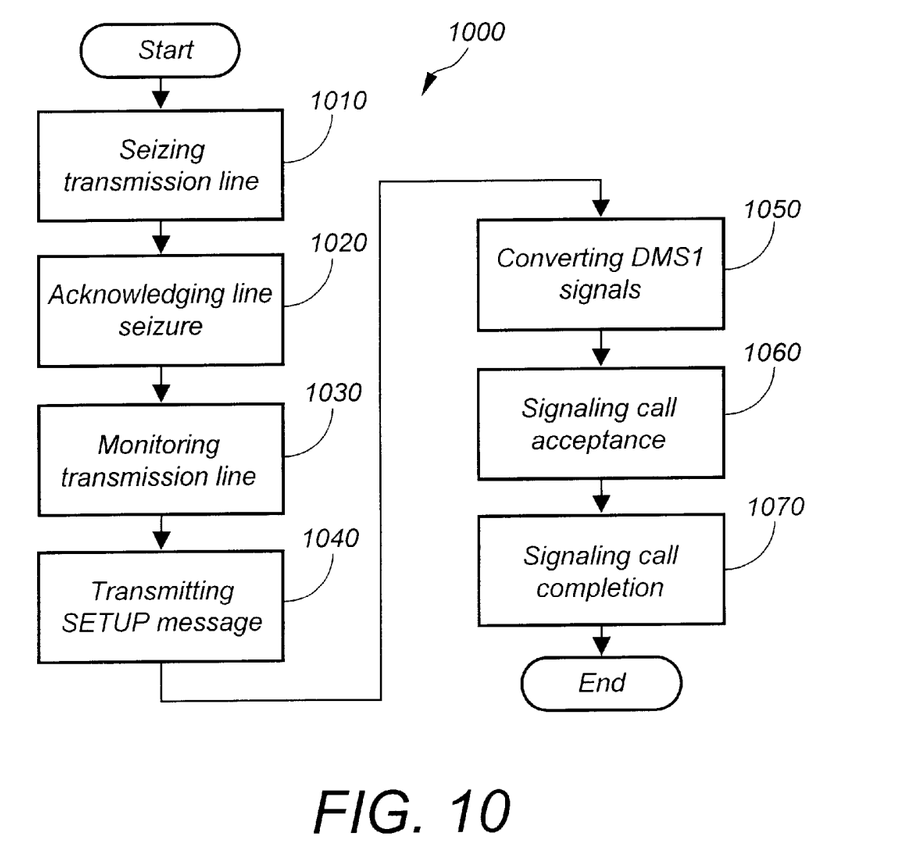

FIG. 10 is a flowchart showing a method 1000 of signaling backhaul in a routing system, including the following steps:

Note: Referring to ISDN signaling gateway 900 in FIG. 9, this example assumes that enbloc signaling has been provisioned in order to simplify the description that follows. Enbloc is an ISDN-type signaling in which address digits are transmitted in one or more blocks, each block containing sufficient address information to enable switching centers to carry out progressive onward routing.

4.10.1 Step 1010: Seizing Transmission Line

In this step, PSTN line supervision driver 350 monitors and controls ABCD signaling bits accessed via second T1 framer 310 in accordance with the provisioned line supervision procedure. When the PSTN switch seizes the line (i.e., trunk), a SETUP_IND signal is sent to PSTN DM 360.

4.10.2 Step 1020: Acknowledging Line Seizure

In this step, PSTN DM 360 receives the SETUP_IND signal and proceeds in accordance with the provisioned address registration procedure. If a DSP resource is required for tone detection and generation, one is allocated by PSTN DM 360 and connected to the time-slot using SMS 500 (FIG. 8). A SETUP_CONF signal is sent to PSTN line supervision driver 350 to acknowledge the line seizure.

4.10.3 Step 1030: Monitoring Transmission Line

In this step, PSTN line supervision driver 350 receives the SETUP_CONF signal and acknowledges the line seizure by generating a wink-start or delay-dial signal on second T1 line 130. If dial pulse registration has been provisioned, PSTN line supervision driver 350 will continue monitoring ABCD signaling and report address digits to PSTN DM 360 using INFO_IND signals. In this example, it is assumed that DTMF tone registration has been provisioned, and PSTN line supervision driver 350 merely monitors the line for a disconnect signal.

4.10.4 Step 1040: Transmitting SETUP Message

In this step, if tone registration has been provisioned, PSTN DM 360 detects DTMF tones and collects address digits in accordance with the provisioned number plan. When the address information is complete, PSTN DM 360 signals SETUP_IND to DMS1 service interface 920, which in turn constructs a Q.931 SETUP message and passes the called and calling numbers enbloc to Q.921 user adaptation layer 910.

4.10.5 Step 1050: Converting DMS1 Signals

In this step, DMS1 service interface 920 provides conversion services between DMS1 service interface 920 and Q.921 service interface 915. DMS1 signals received from PSTN DM 360 are converted to Q.931 messages and passed to Q.921 user adaptation layer 910 in the form of a DL_DATA_IND event as if it were received via a LAPD data link over an ISDN D channel. Conversely, Q.931 messages received from Q.921 user adaptation layer 910 as DL_DATA_REQ events are converted to DMS1 events and signaled to PSTN DM 360.

4.10.6 Step 1060: Signaling Call Acceptance

In this step, PSTN DM 360 waits for DMS1_PROCEED_REQ, DMS1_ALERTING_REQ, and DMS1_CONNECT_REQ signals from Q.921 user adaptation layer 910 via DMS1 service interface 920, and generates call progress tones as necessary. When the DMS1_CONNECT_REQ signal is received, PSTN DM 360 releases DSP resources and signals call acceptance to PSTN line supervision driver 350.

4.10.7 Step 1070: Signaling Call Completion

In this step, PSTN DM 360 signals completion of call connection via DMS1 service interface 920 with a DMS1_CONNECT_CONF event, which is converted to a Q.931 CONNECT ACKNOWLEDGE message and forwarded to Q.921 user adaptation layer 910.

Note: Outgoing call set-up proceeds in a similar manner, but the direction of signal flow is reversed. For example, when Q.921 user adaptation layer 910 receives a Q.931 SETUP message from MGC 610 via SCTP transport service 905, it is forwarded to PSTN DM 360 via DMS1 service interface 920 using a DL_DATA_REQ event. DMS1 service interface 920 converts the Q.931 message to a DMS1_

SETUP_REQ event before forwarding to PSTN DM 360. Call set-up continues with DMS1 service interface 920 performing the necessary conversion of Q.931 messages and DMS1 events.

Call disconnect can be initiated at either end of the circuit, and signal flow through ISDN signaling gateway 900 is as might be expected, given the call set-up example above.

Q.921 data link management is simulated as if an ISDN D channel existed. Data link establish and release events are generated and processed in accordance with the administrative and operational states of second T1 line 130, PSTN line supervision driver 350, and PSTN DM 360. For example, a persistent loss-of-signal alarm on second T1 line 130 results in a DL_RELEASE_IND event being sent to Q.921 user adaptation layer 910. Terminal endpoint identifier (TEI) assignment is also simulated, although a TEI is usually not assigned on a PRI facility, and typically defaults to zero.

I claim:

1. A method of channel-associated signaling backhaul, the method comprising:
   (a) receiving communication data over a first communication link;
   (b) determining whether said received communication data supports SS7 signaling, said step comprising identifying the presence of CAS signaling protocol identifiers in a media channel or associated subchannel;
   (c) where received communication data does not support SS7 signaling, accomplishing a set of steps comprising:
      (i) transmitting a setup message to a DMS1 service interface; and
      (ii) converting DMS1 signals to Q.931 messages and backhauling such messages to a signaling station.

2. The method of claim 1 wherein the Q.931 messages are compatible with an ISDN Q.921 user adaptation layer.

3. The method of claim 1 wherein step 1(a) is accomplished by a Public Switched Telephone Network line supervision driver.

4. The method of claim 1 wherein step 1(a) further comprises monitoring and controlling ABCD signaling bits accessed via a second T1 framer in accordance with a provisioned line supervision procedure.

5. The method of claim 1 wherein:
   (a) step 1(a) further comprises:
      (i) receiving a SETUP_IND signal; and
      (ii) proceeding in accordance with a provisioned address registration procedure;
   (b) if a DSP resource is required for tone detection and generation, allocating such DSP resource.

6. The method of claim 1 wherein:
   (a) step 1(a) further comprises:
      (i) receiving a SETUP_CONF signal; and
      (ii) acknowledging the line seizure by generating a wink-start or delay-dial signal on a second T1 line; and
   (b) if dial pulse registration has been provisioned, PSTN line supervision driver monitors ABCD signaling and reports address digits to PSTN DM using INFO_IND signals.

7. The method of claim 1 further comprising the following steps:
   (a) if tone registration has been provisioned:
      (i) detecting DTMF tones; and
      (ii) collecting address digits in accordance with a provisioned number plan; and
   (b) when the address information is complete, signaling SETUP_IND to DMS1 service interface; and
   (c) constructing a SETUP message; and
   (d) passing called and calling numbers enbloc to a user adaptation layer.

8. The method of claim 1 wherein step 1(c) is accomplished by:
   (a) providing conversion services between a DMS1 service interface and Q.921 service interface;
   (b) receiving DMS1 signals converted said signals to Q.931 messages and passing said messages to a Q.921 user adaptation layer in the form of a DL_DATA_IND event;
   (c) converting Q.931 messages received from Q.921 user adaptation layer as DL_DATA_REQ events to DMS1 events and signaling such messages to PSTN DM.

9. The method of claim 1 wherein step 1(c) is accomplished by PSTN DM:
   (a) waiting for DMS1_PROCEED_REQ, DMS1_ALERTING_REQ, and DMS1_CONNECT_REQ signals from Q.921 user adaptation layer via DMS1 service interface 920; and
   (b) generating call progress tones as necessary, and wherein when the DMS1_CONNECT_REQ signal is received, PSTN DM releases DSP resources and signals call acceptance to PSTN line supervision driver.

10. The method of claim 1 wherein step 1(c) is accomplished by signaling completion of call connection via a DMS1 service interface with a DMS1_CONNECT_CONF event, which is converted to a Q.931 CONNECT ACKNOWLEDGE message and forwarded to a Q.921 user adaptation layer.

11. A data communication system for handling a plurality of signal protocols comprising:
   (a) a routing system connected to a first communication network and a second communication network, further comprising
      (i) a media gateway system for setup and teardown of medial connections;
      (ii) an ISDN signaling gateway for generating associated SS7 signals from CAS data;
   (b) an SS7 signaling gateway for interpretation and/or termination of SS7 signals;
   (c) a first SS7 communication link connecting said SS7 signaling gateway with said first communication network, said first SS7 communication link used for communicating SS7 signaling messages with said first communication network;
   (d) a second SS7 communication link connecting said SS7 signaling gateway with said routing system, said second SS7 communication link used for communicating SS7 signaling messages generated from said ISDN signaling gateway of said routing system with said SS7 signaling gateway.

12. The system of claim 11 wherein a Public Switched Telephone Network DM operates in concert with hardware and firmware subsystems to implement and manage Public Switched Telephone Network CAS signaling protocols.

13. The system of claim 11 comprising a Public Switched Telephone Network interface connecting the routing system to the first communication network or the second communication network;
   wherein the Public Switched Telephone Network interface comprises a Public Switched Telephone Network line supervision driver as a firmware module that manages supervisory signaling and communicates with Public Switched Telephone Network DM via a communication bus.

14. The system of claim 11 comprising a Public Switched Telephone Network interface connecting the routing system to the first communication network or the second communication network;

wherein the Public Switched Telephone Network interface comprises a Public Switched Telephone Network line supervision driver that interfaces directly with a second T1 framer to monitor and manipulate line supervisory signals.

15. The system of claim 11 wherein the system is configured to support one or more line engagement procedures selected from the group consisting of immediate start, wink start, and delay-dial delay start.

16. The system of claim 11 wherein the system is configured to operate such that once a line is seized, a Public Switched Telephone Network DM commences with register signaling through the detection and generation of dual tone multi-frequency tones in the media stream by:

(a) requesting a DSP resource requested from DSPRM via an IPC link, as required; and     (b) connecting to the dial endpoint by SMS through an exchange of primitives via the IPC link.

17. The system of claim 11 wherein call progress signals are also generated using the same DSP.

18. The system of claim 11 connecting the routing system to the first communication network and the second communication network;

wherein the Public Switched Telephone Network interface uses call control primitives supported primitives support by Integrated Services Digital Network DM.

19. The system of claim 11 comprising a Call Manager that operates independently of the type of signaling being performed by Integrated Services Digital Network DM and Public Switched Telephone Network DM.

20. The system of claim 11 configured to restrict network signaling dependencies to the corresponding dial managers.

21. An open network gateway system for connecting a telecommunications network with a packet based communications network, comprising:

a media gateway controller for processing and routing data connections; and     a media gateway connected to said media gateway controller further comprising:

means for receiving communication data from said telecommunications network over a first communication link;

means for determining whether said received communications data supports signaling system 7 (SS7) signaling, said means further identifying the presence of CAS signaling protocol identifier in a media channel or associated subchannel within said first communication link;

means, in response to a determination that said received communication data does not support SS7 signaling, further comprising:

means for transmitting a setup message to a DMS1 service interface; and             means for converting DMS1 signals received within said communication data to Q.931 messages and transmitting said Q.931 messages to said media gateway controller over a second communication link.

22. The system of claim 21 wherein said Q.931 messages are compatible with an ISDN 9.921 user adaptation layer messages are compatible with an ISDN 9.921 user adaptation layer.

* * * * *